(12) United States Patent
Johnson

(10) Patent No.: US 11,401,654 B2
(45) Date of Patent: Aug. 2, 2022

(54) APPARATUS AND METHODS FOR PRE-TREATING SWABS PRIOR TO COLLECTION OF SPECIMENS TO REDUCE FALSE POSITIVE DETECTIONS

(71) Applicant: SoftRay, Inc., Fort Collins, CO (US)

(72) Inventor: Paul E. Johnson, Fort Collins, CO (US)

(73) Assignee: SoftRay, Inc., Fort Collins, CO (US)

( * ) Notice: Subject to any disclaimer, the term of this patent is extended or adjusted under 35 U.S.C. 154(b) by 806 days.

(21) Appl. No.: 16/358,680

(22) Filed: Mar. 19, 2019

(65) Prior Publication Data

US 2019/0284756 A1    Sep. 19, 2019

Related U.S. Application Data

(60) Provisional application No. 62/644,969, filed on Mar. 19, 2018.

(51) Int. Cl.
*D06P 1/00* (2006.01)
*G01N 1/02* (2006.01)

(52) U.S. Cl.
CPC .............. *D06P 1/0024* (2013.01); *G01N 1/02* (2013.01); *G01N 2001/028* (2013.01)

(58) Field of Classification Search
CPC .. D06P 1/0024; G01N 1/02; G01N 2001/028; B01L 3/5029
See application file for complete search history.

(56) References Cited

U.S. PATENT DOCUMENTS

| | | | | |
|---|---|---|---|---|
| 4,828,978 A | * | 5/1989 | Warren, III | G01N 33/54313 435/5 |
| 4,847,199 A | * | 7/1989 | Snyder | G01N 33/585 436/814 |
| 4,978,632 A | * | 12/1990 | Mach | C12Q 1/28 436/66 |
| 5,846,215 A | * | 12/1998 | Zygmont | A61F 13/38 604/1 |
| 6,494,856 B1 | * | 12/2002 | Zygmont | A61F 13/38 604/1 |
| 2002/0197738 A1 | * | 12/2002 | Matsumoto | A61B 10/0051 604/1 |
| 2017/0191996 A1 | * | 7/2017 | Johnson | G01N 33/98 |

* cited by examiner

*Primary Examiner* — Francis C Gray
(74) *Attorney, Agent, or Firm* — Macheledt Bales LLP; Jennifer L. Bales

(57) ABSTRACT

Methods and apparatus for pre-treating swabs prior to collection of specimens to reduce false positive detections by immersing a swab in a liquid chemical pre-treating agent for a treatment period of time. Then the swab is removed and circulated in a rinse agent. The pre-treating agent may be an oxidizing agent, a reducing agent, a bleaching agent (e.g. sodium hypochlorite solution) or a fluorescence suppressing dye (such as Evans blue, Trypan blue, or black dye).

20 Claims, 4 Drawing Sheets

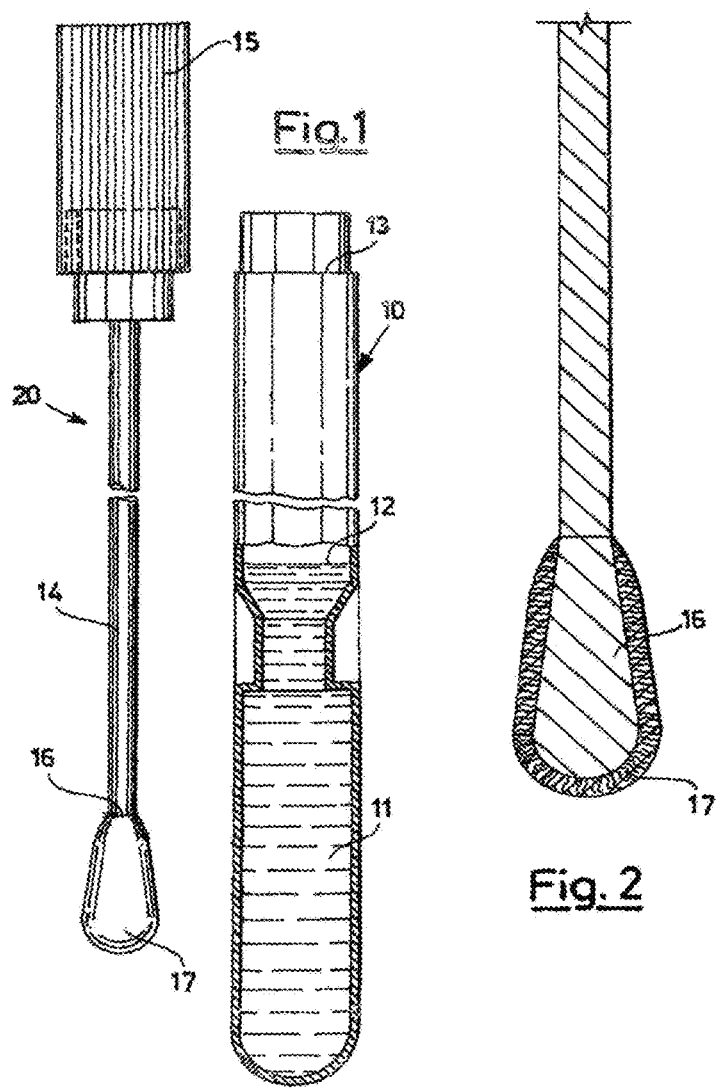
Fig. 1
Fig. 2
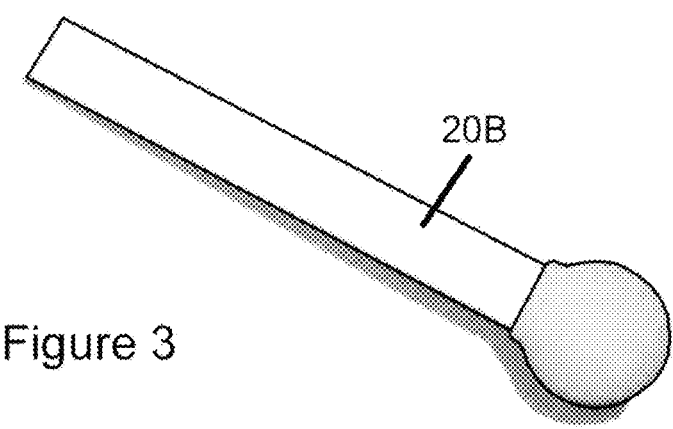
Figure 3

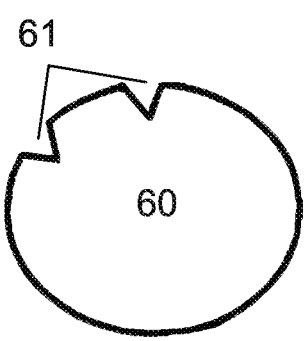
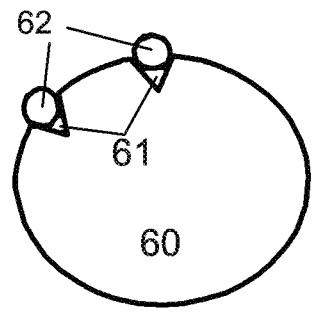
Figure 6A
Figure 6B
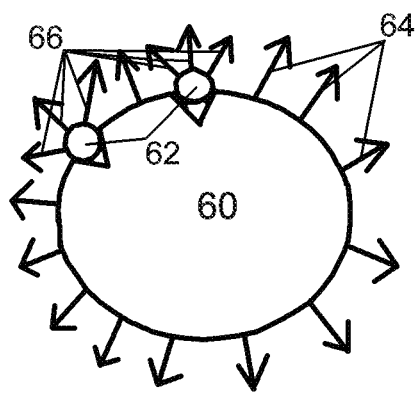
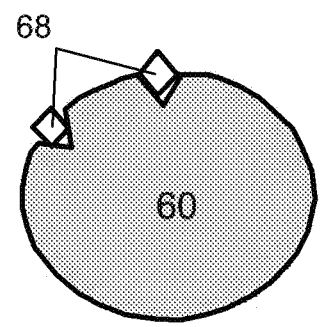
Figure 6C
Figure 6D

APPARATUS AND METHODS FOR PRE-TREATING SWABS PRIOR TO COLLECTION OF SPECIMENS TO REDUCE FALSE POSITIVE DETECTIONS

FIELD OF THE INVENTION

The present invention relates to apparatus and methods for pre-treating swabs for collecting biological (and non-biological) specimens. In particular, the present method relates to pre-treating swabs in order to reduce false positive detections.

DISCUSSION OF RELATED ART

In the fields of environmental and clinical diagnostic analyses, the use of swabs for collecting biological specimens of organic material is well known. A swab includes a surface that can be used to absorb biological or non-biological particles from another surface by means of physical contact for the purpose of analysis. A specimen collection swab typically consists of a wooden or plastic rod around one end of which is wrapped a wad or bundle of fiber such as rayon, nylon or cotton, with hydrophilic properties to allow rapid absorption of specimen to be collected and analyzed.

FIG. 1 (prior art) and FIG. 2 (prior art) show the two components of a Copan swab 30 swab: swab assembly 20 and tube 10 containing a buffer or liquid nutrient 11. Assembly 20 comprises a stopper 15 connected to rod 14 which is covered at its tip 16 with a rounded fiber bundle 17. After a sample is collected with swab 17, assembly 20 is inserted within tube 10 and snap engaged at collar 13 such that tip 16 and swab 17 are immersed in medium 11. This preserves the sample for further analysis. Medium 11 is filled to level 12. See U.S. Pat. No. 8,979,784 issued 17 Mar. 2015 and incorporated herein by reference.

FIG. 3 (prior art) illustrates a Puritan spatulate foam swab 20B, another example of a swab which may be used in the present invention.

Sterile swabs manufactured for medical and environmental sampling are sold by 3M, Puritan, and Copan, among others, and can be purchased individually wrapped or in a vial with a growth medium or sterile buffer.

Typically, the bundle 17 of hydrophilic fiber wrapped around the end 16 of the swab contains sufficient material to absorb 100 microliters of fluid or more. It can be released by immersing it in fluid (as shown in FIG. 1) and subsequently analyzed. There are a number of methods of subsequent analysis including direct microscopic counting with a counting cell, flow cytometry, solid state cytometry, automated microscopic counting on a computer controlled stage, and Fountain Flow cytometry. Flow cytometry, Fountain Flow cytometry, and automated microscopy after fluorescent staining of bacterial or fungal cells would be three desired means of enumerating cells wherein the dyed cells are illuminated at a band of excitation wavelengths and detection made at a band of emission wavelengths. All conventional devices and methods suffer from the drawback of false positive detections of dye being absorbed by or nucleating on small detrital particles carried on the surface of sterile swabs and then released during use and/or the release of autofluorescent detrital particles. We refer to these small particles that exist on a swab before sampling and shed or released prior to measurement as detrital particles, regardless of their origin. Typically several hundred false positive counts per milliliter of fluid are detected using untreated sterile swabs. This is a significant drawback when analyzing surfaces for sterility.

A need remains in the art for apparatus and methods for pre-treating sample collecting swabs to reduce false positive detections.

SUMMARY OF THE INVENTION

It is an object of the present invention to provide a pretreatment of swabs to reduce false positive detections. In various embodiments, the chemical pre-treating agent is an oxidizing or reducing solution and/or a fluorescence suppressing dye, which is applied before swab use in order to eliminate/reduce the active bonding sites for dye nucleation or bonding on detrital particles that are released from the swab during use (on natural or synthetic swab tips, including foam tips), as well as reduce autofluorescence from any detrital particles that are released from the swabs. Various embodiments have demonstrated in reduction of false positives by 70% or more compared to rinsing with sterile water or buffer. At least one embodiment, using Clorox, reduced false positives by at least 90%.

The chemical pretreating agent could comprise sodium hypochlorite bleach (e.g. Clorox), calcium hypochlorite solution, or a fluorescence suppressing dye (for example a counterstain, a secondary stain, or a black dye) that absorbs light at the wavelengths of excitation provided by the cell detection/enumeration device (e.g. epifluorescence microscopy, conventional flow cytometry, or Fountain Flow cytometry) and/or wavelengths of emitted light from autofluorescent detrital particles that can be detected by the measuring device. This counterstain reduces false positive detections by one or more of the following: 1) occupying or otherwise chemically altering potential dye nucleation sites on the detrital particles, inhibiting primary stain nucleation, 2) directly absorbing light that would excite the primary dye on detrital particles, and 3) acting as a suppressant for swab particle autofluorescence. Evans blue and Trypan blue are two such suppressants, which absorb light at the wavelengths of illumination and detected emission, but don't themselves exhibit fluorescence when excited and detected at those wavelengths. Black dyes that are not fluorescent are also viable.

With the aim of better understanding the characteristics and advantages of the invention, a non-limiting example of a practical embodiment is described below, with reference to the figures of the accompanying drawings. The examples refer to the case of a swab suitable for both the collection and storage of a biological or non-biological specimen, and therefore also include a test-tube containing a sterile buffer or nutrient medium suitable for the collected microorganisms (for example) into which the swab is to be immersed after collection. It should be noted that tubes used for sample storage (10) are separate and distinct from tubes used for 1) swab pre-treatment, 2) rinsing after pre-treatment, or 3) incubation with dye for detection of bacteria or other target particles (the latter tubes referred to as "sampling" tubes"). The method applies to many other types of swab as well.

A method for pre-treating swabs having swab bundles designed for specimen collection comprises the steps of submerging the swab bundle into a liquid chemical pre-treating agent for a treatment period of time, removing the swab from the chemical pre-treating agent, submerging the swab bundle into a rinse agent, circulating the rinse agent around the swab bundle for a predetermined rinse period of time; and extracting the swab from the rinse agent. The liquid chemical pre-treating agent that is used reduces false positive detections by at least about 70% compared to performing a similar method using sterile water instead.

The chemical pre-treating agent might be an oxidizing agent, a reducing agent, a bleaching agent (e.g. sodium hypochlorite solution) or a fluorescence suppressing dye (such as Evans blue, Trypan blue, or black dye).

The treatment period of time might range from about 1 to 10 minutes, and the rinse period of time could range from about ½ hour to a few hours. The rinsing step might circulate the rinse agent on the order of a few Hz. After the swab is extracted, it can be submerged in a fluorescence suppressing dye for a dying period of time before being extracted.

In some cases, especially when the pre-treating agent is a fluorescence suppressing dye solution the rinsing step may not be required. The dye solution reduces false positive detections by at least about 70% compared to performing a similar method using sterile water instead. Here the treatment period of time might range from about 30 minutes to several days. Generally the fluorescence suppressing dye has an emission spectra centered at least a few hundred nm apart from a fluorescence detection wavelength of interest.

BRIEF DESCRIPTION OF THE DRAWINGS

FIG. 1 (prior art) shows the two components of a Copan swab assembly and tube containing buffer or nutrient.

FIG. 2 (prior art) shows an exploded view of the swab assembly of FIG. 1.

FIG. 3 (prior art) shows an isometric view of a Puritan spatulate foam swab.

FIGS. 6A-D are schematic drawings showing the effect of the method of FIG. 4 in preventing false positive detections. FIG. 6A shows an untreated detrital particle shed from a swab. FIG. 6B shows dye aggregate particles attaching to defects in the particle of FIG. 6A. FIG. 6C shows fluorescence from the swab particle due to attached dye aggregates and detrital particle autofluorescence. FIG. 6D shows a particle from a swab that has been pre-treated according to the present invention, thereby inhibiting detectable fluorescence.

DETAILED DESCRIPTION OF THE INVENTION

Figure 4:
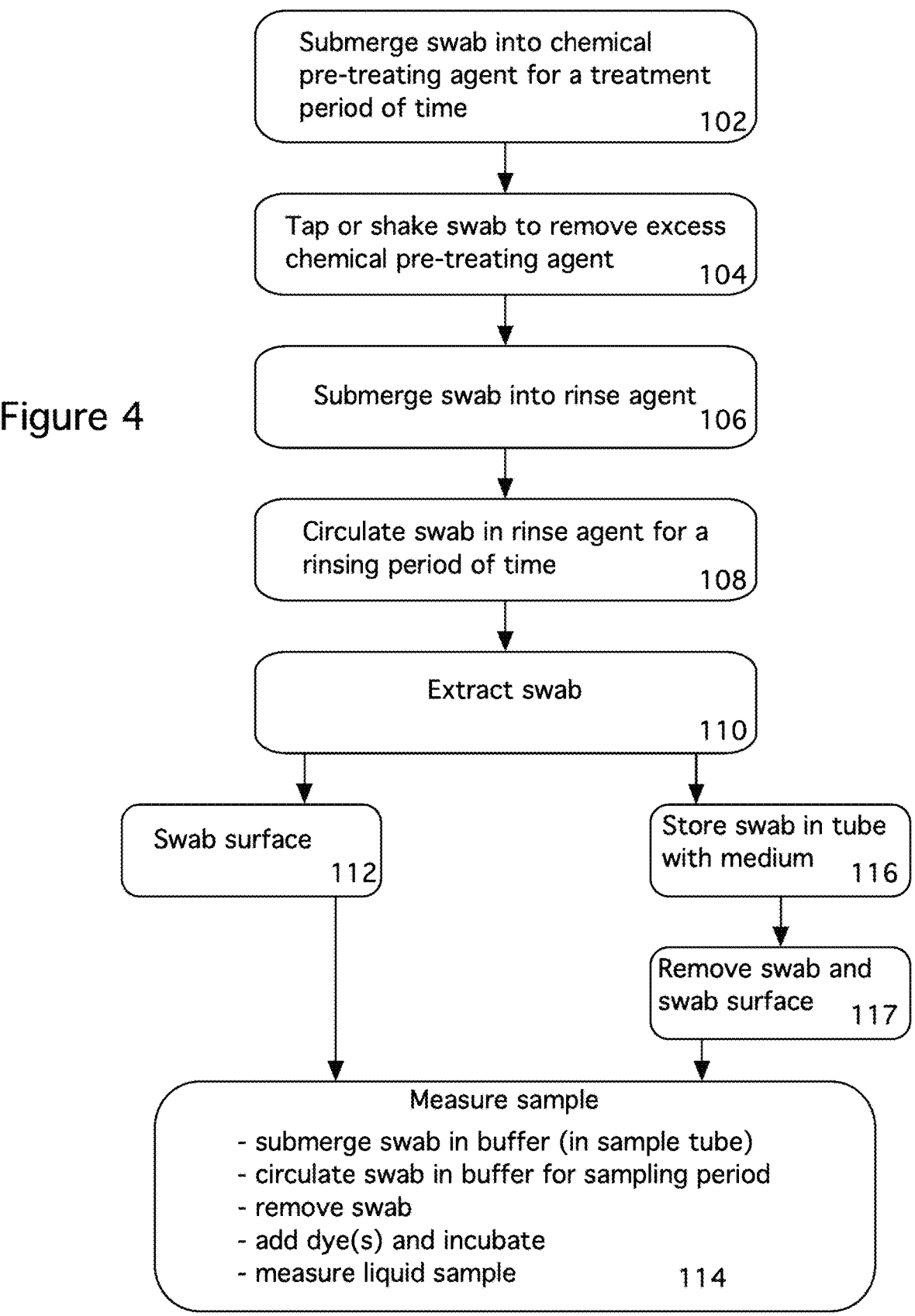
FIG. 4 is a flow diagram illustrating a method according to the present invention.

FIG. 4 is a flow diagram illustrating a method for pre-treating a swab in order to reduce detected false positives. The method illustrates single-use swab pre-treatment (steps 102-110) and use (112-117). If pre-treatment occurs at the manufacturer a similar process is used, but one that is more adaptable for mass production. In the discussion of FIG. 4, a Copan swab such as is shown in FIGS. 1-2 (prior art) is used as an example. However, those skilled in the art will appreciate that various other types of swabs may be used in the process.

Example 1

A Copan swab 30 (R4160) in 10 mL of SRK buffer 11 (an isotonic salt buffer; as in the arrangement shown in FIGS. 1 and 2) is taken from its storage tube 10 and prepared by dipping the swab 20 in a plastic centrifuge tube (pre-treatment tube) of a chemical pre-treating agent (step 102). Examples include Clorox bleach, 3% hydrogen peroxide, and fluorescence suppressing dyes. The time of immersion varies from 1 to 10 minutes depending on the composition and concentration of the immersion fluid. After removal, the swab is shaken or tapped to remove excess cleaning liquid (step 104, optional). The swab is then inserted into a rinsing tube containing rinse buffer (step 106), typically sterile PBS (phosphate-buffered saline), on a rotating lab platform to keep buffer circulating around the swab, typically at 2 Hz (step 108). Using a chemical suppressant that renders the staining dye non-fluorescent (e.g. Clorox bleach) will reduce background, but also unacceptably reduces signal from the dyed cells as well, making this rinsing step advisable. Rinsing steps 106 and 108 also prevent swab use from killing microorganisms that are gathered by the swab prior to use (essential for tests where the collected microorganisms are tested for viability), or neutralizing collected sample particles which might be examined for autofluorescence. Note that steps 106 and 108 may not be necessary, or may not require as long of a rinsing period, when the chemical pre-treating agent is a dye rather than an oxidizing or reducing agent. If a reducing or oxidizing solution is used as the pre-treating agent, the rinse agent could comprise a fluorescence suppressing dye, improving performance further. Note also that the swab could be shipped in a vial of treatment agent or rinsing agent if desired. If the swab is shipped in a vial of treatment agent and rinsing is required or desired, the rinsing step would be performed after shipment and before swab use.

After a period of time (typically 1 hour), the swab is removed (step 110) and either used, (steps 112-114) or placed into a fresh storage tube 10 (step 116), prior to eventual use. Using the swab (steps 112-114 and 116, 117 and 114) typically consists of swabbing a surface and releasing the absorbed sampled bacteria or other particulates into a liquid medium, typically a buffer, by immersion and stirring in a fresh sampling container or tube. The liquid can then be analyzed by the methods mentioned above. Steps 106 and 108 prevent swab 20 use from killing microorganisms that are gathered by the swab prior to use (essential for tests where the collected microorganisms are tested for viability), or neutralizing sample target particles which might be examined for autofluorescence (see FIGS. 5A-5B). Swab 20 can then be removed (step 110) for use, or for insertion into a fresh storage tube (step 116), containing a buffer (e.g. PBS). After the swab is used, sampled particles are removed from the swab and suspended in liquid (usually buffer) in a sampling tube, by shaking, vortexing, inversion, and or stimulation of sample circulation in its tube (step 114). When the sample is ready for analysis, swab 20 is removed from the sampling tube, and the sample incubated with dye. One dye optimum for the detection of microorganisms is SYBR Green I, a DNA intercalating dye. The dyed fluid can then be enumerated for true positive detections by the use of several methods, such as conventional flow cytometry, solid phase cytometry, or Fountain Flow cytometry.

The standard preparation protocol for Fountain Flow cytometry enumeration may be used in step 114 (separate and independent from the protocol for swab preparation):
1. Obtain a 10-ml aliquot of fluid to be examined.
2. Add 4 µl of SYBR Green I stock (30 µl Lonza 10,000×/1 ml DMSO) and incubate for 10 minutes.
3. Add 2 µl of Evans blue stock (50 mg/1 ml in PBS).

Example 2

Trypan blue and Evans blue have emission spectra that are well outside our dye fluorescence detection wavelength band (530 nm), with Evans Blue having an emission peak at 650 nm and Trypan blue at 670 nm. Proceeding as per Example 1, a Copan swab (R4160) in 10 mL of SRK buffer (an isotonic salt buffer; as in the arrangement shown in FIGS. 1 and 2) was taken from its storage tube and prepared by dipping the swab in a plastic centrifuge (pre-treatment) tube of Evans blue stain (20 ul/10 ml of the Evans blue stock solution given above into PBS) using the protocol from FIG. 4 (step 102). The time of immersion varies from <1 h to 3 days depending on the degree of sensitivity desired. Immersion is preferably accompanied by circulation of dye at approximately ~2 Hz on a rotating lab platform. After removal, the swab can be shaken or tapped to remove excess dye (optional, step 104). The swab is either used (step 112) or placed into a storage tube (step 116; similar to what is shown in FIG. 1), prior to eventual use (step 117). The sample is measured in step 114 as above. Sampled particles are removed by shaking, vortexing, inversion, and or stimulation of sample circulation in its sampling tube. When the sample is ready for analysis, the swab is removed from the sampling tube, and the sample incubated with dye. The dyed fluid can then be enumerated for true positive detections by the use of several methods such as conventional flow cytometry, solid phase cytometry, or Fountain Flow cytometry.

Example 3

Proceeding as per Example 1 shown in FIG. 4, a rod with a spatulate foam end 20B (such as Puritan 25-1805 1PF RND FDNA shown in FIG. 3) is processed using the same steps as Example 1, but with immersion and storage (step 116) in wider mouth containers to accommodate the larger breadth of the swab.

Determination of Efficacy of Pretreatment

To determine the efficacy of pretreatment protocols for swabs using an oxidizing or reducing bleaching agent, experiments were performed using Fountain Flow cytometry as an assessment tool, measuring false positive detections before and after treatment (as per the Examples above). The results are summarized in Table 1 as detections/ml of sample. The samples were analyzed on a Fountain Flow cytometer as described in Johnson, Moriwaki, and Johnson, J Clin Lab Anal 2017, 31(6).doi:10.1002/jcla.22115. Staining of the sample was performed using SYBR Green I with a 10 m dye incubation period followed by Evans blue as described above.

TABLE 1

| Date | Sample | Treatment | Counts/ml | Replicates |
| --- | --- | --- | --- | --- |
| 31 Jan. 2018 | Copan | Clorox | 0.3 | 2 |
| 31 Jan. 2018 | Copan | Clorox | 5.1 | 3 |
| 9 Mar. 2018 | Copan | Control | 842.9 | 3 |
| 9 Mar. 2018 | Copan | Peroxide | 10 | 3 |
| 9 Mar. 2018 | Copan | Autofl. | 5.8 | 3 |
| 22 Feb. 2018 | Puritan | Control | 28.2 | 3 |
| 22 Feb. 2018 | Puritan | Clorox | 1 | 3 |

Table 1 is a summary table showing efficacy of Clorox and hydrogen peroxide pretreatments on Copan and Puritan (spatulate, sponge) swabs, as determined by Fountain Flow cytometry false positive counts. Swabs were pretreated with Clorox, hydrogen peroxide, or not pretreated (control), then dyed with SYBR Green I or not (the latter to determine level of autofluorescent detrital particles). Data indicates that both Clorox and hydrogen peroxide used according to the present invention serve to dramatically limit the number of false positive detections.

TABLE 2

| Date | Treatment | Mean/ml | Std Error | Replicates |
| --- | --- | --- | --- | --- |
| 28 Jan. 2019 | EDTA | 15.6 | 1.1 | 3 |
| 28 Jan. 2019 | EDTA | 57.5 | 7.8 | 3 |
| 28 Jan. 2019 | EDTA | 17.3 | 6.4 | 3 |
| 29 Jan. 2019 | PBS | 11.0 | 0.8 | 3 |
| 29 Jan. 2019 | PBS | 12.3 | 3.5 | 3 |
| 29 Jan. 2019 | PBS | 6.9 | 1.3 | 2 |
| 29 Jan. 2019 | Clorox | 1.9 | 1.0 | 3 |
| 29 Jan. 2019 | Clorox | 0.4 | 0.4 | 3 |
| 29 Jan. 2019 | Clorox | 1.5 | 0.2 | 3 |
| 29 Jan. 2019 | PBS | 10.0 | 1.9 | 3 |

Table 2 is a summary table showing efficacy of Clorox treatment on Copan swabs as determined by Fountain Flow Cytometry false positive counts vs. PBS and EDTA (500 mM EDTA buffer, adjusted to pH 8.0) rinses. All three treatments (Clorox, PBS, and EDTA were of 10 m duration. Clorox is superior by ~10× to PBS and EDTA in lowering false positive counts. PBS and EDTA rinses are similar in efficacy to hydrogen peroxide.

TABLE 3

| Date | Immersion | Mean/ml | Std Error | Replicates |
| --- | --- | --- | --- | --- |
| 15 Feb. 2019 | 1 h | 9.7 | 1.3 | 3 |
| 15 Feb. 2019 | 22 h | 1.3 | 0.4 | 4 |
| 18 Feb. 2019 | 72 h | 0.8 | 0.2 | 3 |
| 18 Feb. 2019 | null | 1.9 | 0.4 | 4 |

Table 3 is a summary table showing efficacy of Evans blue on Copan swabs, as determined by Fountain Flow cytometry false positive counts. In particular, it shows the decline in false count rate with increasing suppressing dye incubation time from 1 hour to 22 hours and longer. Swabs were first pretreated with Evans blue. Subsequently, samples were prepared from swabs immersed in PBS, then dyed with SYBR Green I and Evans blue (step 114). For a null (control) comparison, SYBR Green I and Evans blue were added to PBS without prior immersion of a swab and then immediately measured with Fountain Flow cytometry. Data indicates Evans blue is more effective with a longer pretreatment (dying) period. A ~24 h pretreatment gives a false count rate at the same level as staining PBS without swab immersion.

Figure 5B:
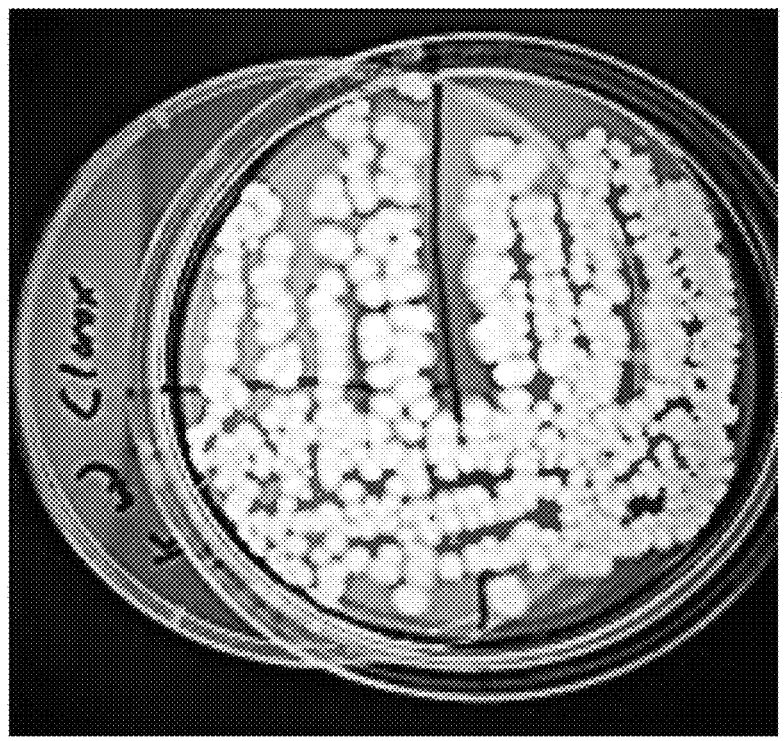
FIGS. 5A and 5B are top views of the results of an experiment performed to demonstrate the efficacy of a rinsing step according to the present invention in preventing reduction of genuine positive detections.
Figure 5A:
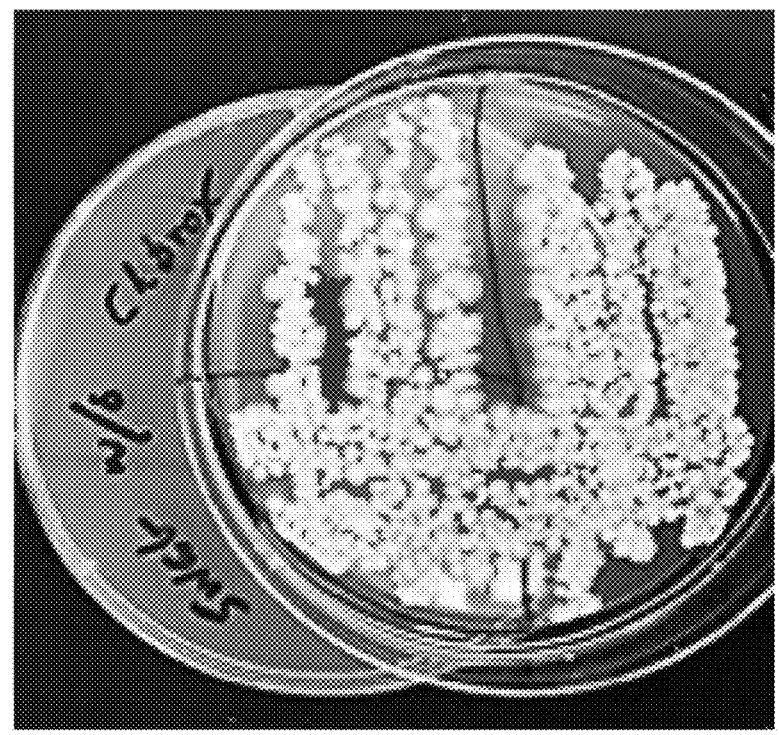

FIGS. 5A and 5B are top views of the agar plates used to demonstrate the efficacy of rinsing steps 106 and 108 in FIG. 4. The purpose of rinsing steps 106 and 108 is to prevent the chemical pretreatment step 102 from leaving residue that will adversely affect true positive detections in use. The experiment consisted of dipping a Copan swab 20 into an *E. coli* sample and then streaking on a tryptic soy agar plate. FIG. 5A shows the result for an untreated swab 20, while FIG. 5B shows the result for a treated and rinsed swab 20. The rinsing steps 106 and 108 are shown to dilute any bleach remaining in/on swab 20 to such a large extent that bacteria are not lysed by the process. Thus, true positive detections are essentially unaffected, as desired.

FIGS. 6A-D are schematic drawings showing the effect of the method of FIG. 4 in preventing false positive detections.

FIG. 6A shows the effects of a bleach/dye suppressing fluorescence on an untreated detrital particle 60 attached to swab bundle 17 surface or interior. Particle 60 might be a detrital particle that was stuck to the swab as part of the manufacturing process. It could be, for example, a 5 micron diameter piece of swab material 17 (cotton, e.g. if the swab is cotton flocks on a plastic or wooden shaft), plastic shed from plastic container 10 holding the swab bundle 17 and swab buffer 11, pieces of an adhesive that was used to adhere the swab absorbent material to the shaft, material that was shed from shaft 14, bacterial contamination that occurred in manufacturing, etc. If particle 60 is small enough (<50 μm), it might well be transparent, meaning that autofluorescence would occur throughout particle 60; moreover, it would be hard to discriminate from bacteria (typically <5 μm) or bacterial clusters.

FIG. 6A shows a cross section of detrital particle 60—here shown as a cross section of a round particle. Two surface defects or bonding sites 61 are shown (not to scale). Defects 61 might also occur within particle 60. FIG. 6B shows that dye aggregate particles 62 readily attach to defects 61. FIG. 6C shows diffuse fluorescence (from absorbed dye molecules) and/or autofluorescence 64, as well as fluorescence 66 from dye aggregate particles 62. FIG. 6D shows the suppressing effects of counterstain dye particles or molecules 68 occupying surface defect sites 61, inhibiting primary dye attachment and fluorescence. In addition, 6D shows counterstain dye being absorbed by particle 60 (shaded in grey), inhibiting autofluorescence and/or diffuse fluorescence from dye molecules absorbed by the detrital particle. Counterstain or bleach may serve to alter potential dye binding sites by chemically altering or binding to those sites.

While the exemplary preferred embodiments of the present invention are described herein with particularity, those skilled in the art of swabs for collection of specimens will appreciate various changes, additions, and applications other than those specifically mentioned, which are within the spirit of this invention. The method might use both an oxidation chemical pre-treating agent (e.g. Clorox bleach) and a suppressing dye (such as Evans blue). Steps 102-110 would be performed with the oxidizing agent, followed by performing at least steps 102 and 110 with the fluorescence suppressing dye.

What is claimed is:

1. The method for pre-treating swabs having swab bundles designed for specimen collection comprising the steps of:
   (a) submerging the swab bundle into a liquid chemical pre-treating agent for a treatment period of time;
   (b) removing the swab from the chemical pre-treating agent;
   (c) submerging the swab bundle into a rinse agent;
   (d) circulating the rinse agent around the swab bundle for a predetermined rinse period of time; and
   (e) extracting the swab from the rinse agent;
   wherein the liquid chemical pre-treating agent reduces false positive detections by at least about 70% compared to performing a similar method using sterile water instead.

2. The method of claim 1 wherein the chemical pre-treating agent is an oxidizing agent.

3. The method of claim 1 wherein the chemical pre-treating agent is a bleaching agent.

4. The method of claim 3 wherein the chemical pre-treating agent is sodium hypochlorite solution.

5. The method of claim 1 wherein the rinsing agent is a fluorescence suppressing dye.

6. The method of claim 1 wherein the chemical pre-treating agent is a fluorescence suppressing dye.

7. The method of claim 6 wherein the fluorescence suppressing dye comprises Evans blue.

8. The method of claim 6 wherein the fluorescence suppressing dye comprises Trypan blue.

9. The method of claim 6 wherein the fluorescence suppressing dye comprises a black dye.

10. The method of claim 1 wherein the chemical pre-treating agent is a reducing agent.

11. The method of claim 1 wherein the treatment period of time ranges from about 1 to 10 minutes.

12. The method of claim 1 wherein the rinse period of time ranges from about ½ hour to a few hours.

13. The method of claim 12 wherein step (b) circulates the rinse agent on the order of a few Hz.

14. The method of claim 1, further comprising the steps following step (e) comprising:
   (f) submerging the swab in a fluorescence suppressing dye for a dying period of time;
   (g) extracting the swab from fluorescence suppressing dye.

15. The method for pre-treating swabs having swab bundles designed for specimen collection comprising the steps of:
   (a) submerging the swab bundle into the fluorescence suppressing dye solution for a treatment period of time; and
   (b) removing the swab from the dye solution;
   wherein the dye solution reduces false positive detections by at least about 70% compared to performing a similar method using sterile water instead.

16. The method of claim 15 wherein the treatment period of time ranges from about 30 minutes to several days.

17. The method of claim 15 where the fluorescence suppressing dye has an emission spectra centered at least a few hundred nm apart from a fluorescence detection wavelength of interest.

18. The method of claim 15 wherein the fluorescence suppressing dye comprises Evans blue.

19. The method of claim 15 wherein the fluorescence suppressing dye comprises Trypan blue.

20. The method of claim 15 wherein the fluorescence suppressing dye comprises a black dye.

* * * * *